Nov. 27, 1923.
F. D. BURGESS
1,475,425
DRAFT GEAR FOR TRAILERS
Filed July 25, 1919     2 Sheets-Sheet 1
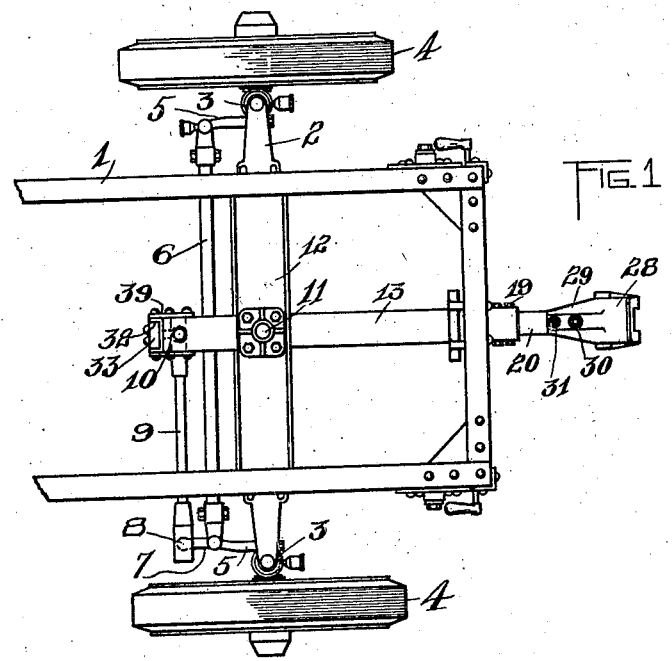
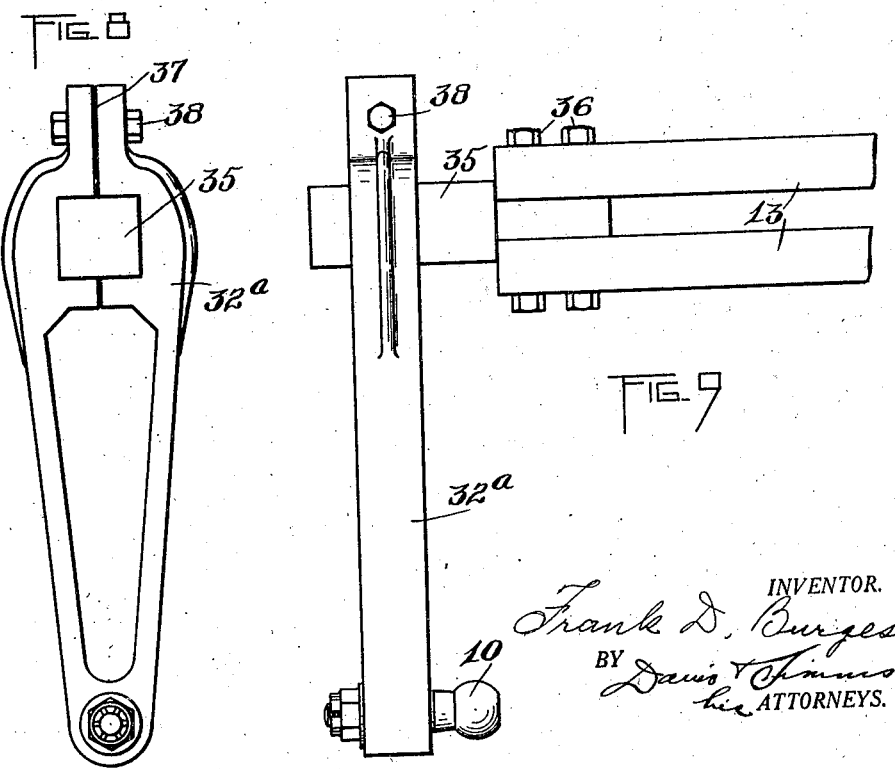
INVENTOR.
Frank D. Burgess
BY Davis & Timmes
his ATTORNEYS.

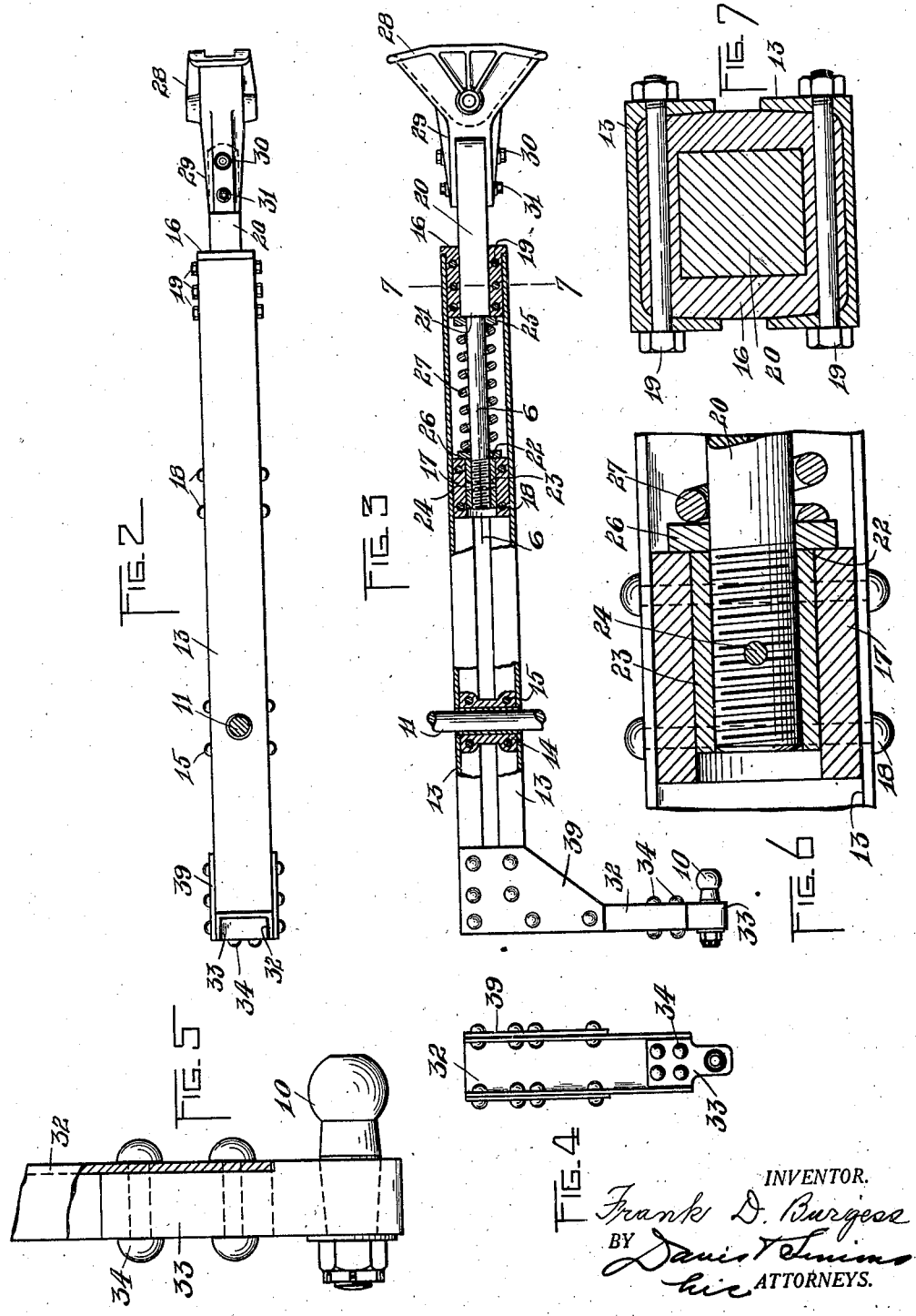
Nov. 27, 1923.   1,475,425
F. D. BURGESS
DRAFT GEAR FOR TRAILERS
Filed July 25, 1919   2 Sheets-Sheet 2
INVENTOR.
Frank D. Burgess
BY
ATTORNEYS.

Patented Nov. 27, 1923.

1,475,425

UNITED STATES PATENT OFFICE.

FRANK D. BURGESS, OF NEWARK, NEW YORK, ASSIGNOR TO ARCADIA TRAILER CORPORATION, OF NEWARK, NEW YORK, A CORPORATION.

DRAFT GEAR FOR TRAILERS.

Application filed July 25, 1919. Serial No. 313,300.

*To all whom it may concern:*

Be it known that I, FRANK D. BURGESS, a citizen of the United States, and resident of Newark, in the county of Wayne and State of New York, have invented certain new and useful Improvements in Draft Gears for Trailers, of which the following is a specification.

The present invention relates to draft gears for trailers, an object of this invention being to provide a draft bar of maximum strength, while at the same time giving one of minimum weight for such strength. Still another object of the invention is to provide a draft bar in which the head carrying slide is cushioned in both directions of its movement by a spring mounted in such a manner that it may be readily removed when broken for the purpose of introducing a new spring.

To these and other ends, the invention consists of certain parts and combinations of parts, all of which will be hereinafter described, the novel features being pointed out in the appended claim.

In the drawings:

Fig. 1 is a plan view of the forward end of a frame of a trailer embodying the present invention;

Fig. 2 is a plan view of a draft bar employed in this invention;

Fig. 3 is a side view, partially in vertical section of the draft bar;

Fig. 4 is a detail view of the rear end of the draft bar;

Fig. 5 is an enlarged detail view of the lower end of the depending arm at the rear of the draft bar;

Fig. 6 is an enlarged section on the line 6—6, Fig. 3;

Fig. 7 is an enlarged vertical section on the line 7—7 Fig. 3; and

Figs. 8 and 9 are, respectively, an end and a side elevation of another embodiment of the invention in which the depending arm at the rear of the draft bar is adjustably connected with said draft bar.

Referring more particularly to the drawings, 1 indicates the main frame of the trailer, which is supported upon springs, not shown, arranged upon a stationary axle 2. This axle 2 has at its opposite ends pivotally mounted wheel carrying spindles 3 on which the wheels 4 turn. These wheel carrying spindles are each provided with a rearwardly extending arm 5, and these two arms are in turn connected by a single rod 6 which, at its ends, has pivotal connection with the arms. One of these arms 5 is extended rearwardly at 7, and has a ball and socket connection 8 of any desired form with one end of a rod 9, the latter in turn having a ball and socket connection 10 with a depending arm on the rear end of a draft bar which in turn is pivoted at 11 between two cross pieces 12 mounted upon the main frame 1. It has been found that by connecting the wheel carrying spindles 3 by a single rod, and providing a connection between the spindles and a draft carrying bar mounted upon a frame which is supported through springs on the axle, a weight imposed upon the frame does not cause the wheels to operate in planes at angles to each other. While the wheels will shift slightly under the weight to planes at angles to the longitudinal axis of the main frame, yet this is not objectionable as the wheels at the other end of the main frame will also shift, and consequently the wheels will travel in the direction of the line of draft, although the longitudinal axis of the body of the vehicle will shift to a slight angle to this line of draft. If the draft bar has two separate connections with the wheel spindles then the planes of operation of the wheels will be at angles to each other, and as a consequence there is a rubbing action on the tires of the vehicle which tends to wear out such tires in a short time. This objection is overcome by the foregoing construction.

The draft bar illustrated herein is of novel construction, and embodies in this instance a rear pivoted portion and a forward slide portion movable longitudinally of the inner pivoted portion. The rear pivoted portion comprises in this instance two channel bars 13 having their channel faces disposed toward each other. Arranged between these bars is a pivot block 14 having a vertical opening registering with openings in the upper and lower bars 13 to provide a bearing in which the pivot pin 11 operates. This pivot block is preferably secured to and between the bars 13 by two pairs of horizontally arranged bolts 15, one pair passing through the flanges of the upper bar as well as the block, and the other pair passing through the flanges of the lower bar as well as the block. Also arranged between the channel bars 13 are two guide blocks 16 and 17, the guide block 17, being secured in spaced relation to the forward end of the rear member of the draft bar by bolts 18 passing through the block and the channel bars, while the guide block 16 is secured by removable bolts 19 to the forward end of the rear pivoted member of the draft bar. These guide blocks 16 and 17 serve for guiding the slide member 20 of the draft bar. This slide member, in this instance, is formed with two surrounding shoulders or fixed abutments 21 and 22, the shoulder 21 being provided by reducing the slide, while the shoulder 22 is provided by one end of a nut 23 which engages screw threads on the reduced portion of the slide and operates in the guide block 17. A tapered pin 24 may be passed through the nut 23 and the screw threaded end of the slide for the purpose of preventing the turning of the nut on the slide. Arranged on the slide 20, between the abutments 21 and 22, are two movable abutments 25 and 26, the movable abutment 25 cooperating with the abutment 21 and the abutment formed by the rear end of the slide block 16 while the movable abutment 26 cooperates with the abutment 22 and the abutment formed by the forward end of the guide block 17. Between these two movable abutments 25 and 26 a helical spring 27 is arranged, said spring surrounding the reduced portion of the slide 20. With this arrangement it is apparent that the movement of the slide 20 on the draft bar is cushioned in both directions, the movable abutment 26 compressing the spring against the movable abutment 25 when the slide 20 is moved forwardly, the abutment 25 then cooperating with the abutment formed by the end of the slide block 16, and when the slide 20 is moved rearwardly, the abutment 25 will compress the spring against the abutment 26 whose movement will be restrained by the abutment formed by the forward end of the slide block 17. It is apparent that should the spring 27 become broken, the spring may be readily replaced by a new one by removing the bolts 19 securing the slide block 16, after which the slide block 16 with the sliding spring thereon may be withdrawn from the rear pivoted portion of the draft bar.

The draft head 28 is preferably removably secured to the slide 20, and to this end has two rearwardly extending arms 29 spaced apart and lying above and below the slide 20. These arms are secured to the slide by two bolts 30 and 31, one of said bolts in this instance the forward one, being of greater strength than the other or rear one. This arrangement is designed for the purpose of relieving any lateral strains on the head which would tend to destroy the draft gear. By the construction shown the small bolt 31 will be sheared and the draft head 28 will then swing on the bolt 30, preventing any breaking of the draft gear. The depending arm at the rear end of the draft bar may be connected to the latter in any suitable manner. In the embodiment shown in Figs. 1–7, this arm is in the form of a channel piece 32 which abuts the rear ends of the channel pieces 13, and is held to said draft bar by two plates 39 riveted to the rear end of the channel bars to project rearwardly therefrom and also downwardly therefrom, the rearwardly and downwardly projecting portions being riveted to the side flanges of the channel bar 32. At its lower end a casting 33 is riveted at 34 to the web of the channel member between the flanges, and this casting 33 carries the ball of the ball and socket joint 10. In the embodiment of the invention shown in Figs. 8 and 9 the channel members 13 of the draft bar have a rectangular block 35 secured between them by bolts 36, said block projecting from the rear ends of the bar and acting as a guide. On this guide the arm $32^a$ is adjustably secured, this arm being in the form of a casting having an opening for receiving the guide and provided with a slit 37 intersecting said opening, the walls of the slit being drawn together by a bolt 38 for the purpose of clamping the depending arm $32^a$ upon the guide 35 to hold the arm in its adjusted position. The ball of the ball and socket joint 10 is secured at the lower end of the arm $32^a$ as in the other embodiment of the invention.

From the foregoing it will be seen that there has been provided a draft-bar which gives a minimum weight with a maximum strength. The movement of the sliding portion of the draft bar is cushioned in both directions, and the cushioning spring is so mounted that it may be readily removed when broken for the purpose of substituting a new spring.

What I claim as my invention and desire to secure by Letters Patent is:

A draft bar comprising a pivotally mounted rear member formed of two channel pieces arranged with their channels disposed toward each other, a pair of guide blocks arranged between the channel members, one of which is arranged at the forward ends of the members, bolts passing through the flanges of the channel pieces securing the guide blocks between the channel members and securing the channel pieces together, the bolts of the guide block at the forward end of the channel members being removable to permit the forward guide block to be removed, a forward member guided on both of the guide blocks and provided with two fixed abutments, two movable abutments arranged on the forward member between the two fixed abutments, and a spring arranged about the forward member between the movable abutments and holding the latter against the fixed abutments on the forward member and against the opposed faces of the guide blocks.

FRANK D. BURGESS.